United States Patent
Simmons

(10) Patent No.: US 7,185,278 B1
(45) Date of Patent: Feb. 27, 2007

(54) SEPARATING AND MOVING DOCUMENT OBJECTS USING THE MOVEMENT OF A WIPER BAR

(75) Inventor: Alex J. Simmons, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 304 days.

(21) Appl. No.: 10/186,837

(22) Filed: Jun. 28, 2002

(51) Int. Cl.
*G06F 17/24* (2006.01)

(52) U.S. Cl. ............... 715/521; 715/520; 715/788; 715/799

(58) Field of Classification Search ........ 715/520–521, 715/710, 798, 802, 815, 800, 833, 788, 799
See application file for complete search history.

(56) References Cited

U.S. PATENT DOCUMENTS

| | | | | |
|---|---|---|---|---|
| 2,354,332 | A | 7/1944 | Polydoroff | 343/788 |
| 5,321,768 | A | 6/1994 | Fenrich et al. | 382/178 |
| 5,327,342 | A | 7/1994 | Roy | 345/467 |
| 5,339,391 | A * | 8/1994 | Wroblewski et al. | 345/607 |
| 5,347,295 | A * | 9/1994 | Agulnick et al. | 345/156 |
| 5,442,742 | A | 8/1995 | Greyson et al. | 715/539 |
| 5,491,495 | A | 2/1996 | Ward et al. | 345/173 |
| 5,500,937 | A | 3/1996 | Thompson-Rohrlich | 715/764 |
| 5,517,578 | A * | 5/1996 | Altman et al. | 382/181 |
| 5,559,942 | A * | 9/1996 | Gough et al. | 715/802 |
| 5,583,542 | A | 12/1996 | Capps et al. | 345/173 |
| 5,590,257 | A * | 12/1996 | Forcier | 715/530 |
| 5,613,019 | A | 3/1997 | Altman et al. | 382/311 |
| 5,649,133 | A | 7/1997 | Arquie | 715/764 |
| 5,655,136 | A | 8/1997 | Morgan | 382/187 |
| 5,760,773 | A | 6/1998 | Berman et al. | 715/808 |
| 5,768,418 | A | 6/1998 | Berman et al. | 382/187 |
| 5,809,498 | A | 9/1998 | Lopresti et al. | 707/6 |

(Continued)

FOREIGN PATENT DOCUMENTS

DE 40 26 852 A1 2/1991

(Continued)

OTHER PUBLICATIONS

European Search Report dated Nov. 11, 2005.

(Continued)

*Primary Examiner*—Cesar B Paula
(74) *Attorney, Agent, or Firm*—Merchant & Gould

(57) ABSTRACT

A tool is provided for managing the available space in an electronic document. The tool can be used to move document objects and/or expand the boundaries or margins of a page to enable the addition or expansion of one or more document objects. The tool also can be used to move document objects and/or contract the boundaries of a page to reduce the available space on the page. A simple but user interface enables a user to easily move one or more document objects to create more space between document objects on the page or to eliminate space between document objects on the page. The user interface also enables a user to easily create more space within a particular document object. The user interface utilizes a wiper bar that spans the page or the document object and selects the objects that may be affected by creating or eliminating space on the page. A side wiper also may be provided to move document boundaries away from the objects on the page.

27 Claims, 11 Drawing Sheets

U.S. PATENT DOCUMENTS

| | | | | |
|---|---|---|---|---|
| 5,838,326 | A | 11/1998 | Card et al. | 715/775 |
| 5,838,819 | A | 11/1998 | Ruedisueli et al. | 382/187 |
| 5,864,635 | A | 1/1999 | Zetts et al. | 382/187 |
| 5,867,150 | A | 2/1999 | Bricklin et al. | 345/173 |
| 5,874,957 | A * | 2/1999 | Cline et al. | 715/786 |
| 5,953,735 | A | 9/1999 | Forcier | 715/541 |
| 5,963,208 | A | 10/1999 | Dolan et al. | 715/760 |
| 5,970,455 | A | 10/1999 | Wilcox et al. | 704/270 |
| 6,061,472 | A | 5/2000 | Hullender et al. | 382/187 |
| 6,069,626 | A * | 5/2000 | Cline et al. | 715/786 |
| 6,081,829 | A * | 6/2000 | Sidana | 709/203 |
| 6,108,445 | A | 8/2000 | Uehara | 382/189 |
| 6,128,633 | A * | 10/2000 | Michelman et al. | 715/525 |
| 6,154,219 | A | 11/2000 | Wiley et al. | 345/587 |
| 6,154,758 | A | 11/2000 | Chiang | 715/541 |
| 6,188,405 | B1 | 2/2001 | Czerwinski et al. | 715/764 |
| 6,223,145 | B1 | 4/2001 | Hearst | 703/22 |
| 6,279,014 | B1 | 8/2001 | Schilit et al. | 715/512 |
| 6,295,372 | B1 | 9/2001 | Hawkins et al. | 382/187 |
| 6,304,272 | B1 | 10/2001 | Schanel et al. | 345/676 |
| 6,337,698 | B1 | 1/2002 | Keely, Jr. et al. | 345/179 |
| 6,340,967 | B1 | 1/2002 | Maxted | 345/179 |
| 6,345,389 | B1 | 2/2002 | Dureau | 725/116 |
| 6,355,889 | B1 | 3/2002 | Butcher et al. | 178/18.03 |
| 6,487,567 | B1 * | 11/2002 | Michelman et al. | 715/525 |
| 6,487,569 | B1 | 11/2002 | Lui et al. | 715/530 |
| 6,529,215 | B2 | 3/2003 | Golovchinsky et al. | 715/764 |
| 6,565,611 | B1 | 5/2003 | Wilcox et al. | 715/541 |
| 6,594,390 | B2 | 7/2003 | Frink et al. | 382/187 |
| 6,651,221 | B1 * | 11/2003 | Thompson et al. | 715/541 |
| 6,654,035 | B1 * | 11/2003 | DeStefano | 715/798 |
| 6,661,409 | B2 | 12/2003 | Demartines et al. | 345/173 |
| 6,678,865 | B1 * | 1/2004 | Pratley et al. | 715/509 |
| 6,690,364 | B1 | 2/2004 | Webb | 345/179 |
| 6,741,749 | B2 | 5/2004 | Herbert, Jr. | 382/246 |
| 6,801,190 | B1 | 10/2004 | Robinson et al. | 345/173 |
| 6,833,827 | B2 | 12/2004 | Lui et al. | 345/373 |
| 6,836,759 | B1 | 12/2004 | Williamson et al. | 704/235 |
| 6,989,822 | B2 | 1/2006 | Pettiross et al. | 345/179 |
| 7,002,560 | B2 | 2/2006 | Graham | 345/179 |
| 7,039,234 | B2 | 5/2006 | Geidl et al. | 382/187 |
| 7,079,713 | B2 | 7/2006 | Simmons | 382/321 |
| 2001/0000960 | A1 | 5/2001 | Dettloff | 343/748 |
| 2002/0078035 | A1 | 6/2002 | Frank et al. | 707/3 |
| 2002/0097270 | A1 * | 7/2002 | Keely et al. | 345/764 |
| 2002/0126153 | A1 | 9/2002 | Withers et al. | 345/773 |
| 2003/0119469 | A1 | 6/2003 | Karr et al. | 455/307 |
| 2003/0214531 | A1 | 11/2003 | Chambers | 345/764 |
| 2003/0215142 | A1 | 11/2003 | Gounares et al. | 382/190 |
| 2004/0003350 | A1 * | 1/2004 | Simmons et al. | 715/517 |

FOREIGN PATENT DOCUMENTS

JP    3-270403    12/1991

OTHER PUBLICATIONS

Wilcox et al., "Dynomite: A Dynamically Organized Ink and Audio Notebook," Computer-Human Interaction, Mar. 27, 1997, pp. 186-193.

U.S. Final Office Action dated Mar. 13, 2006 cited in U.S. Appl. No. 10/186,812.

Thomas Jakobsen, "Advanced Character Physics," 2001, Proceedings, Game Developer's Conference 2001, pp. 1-17.

U.S. Final Official Action dated Aug. 10, 2006 cited in U.S. Appl. No. 10/186,874.

Copending U.S. Appl. No. 10/782,133, filed Feb. 18, 2004 entitled "Glom Widget".

Copending U.S. Appl. No. 10/782,132, filed Feb. 18, 2004 entitled "Tapping to Create Writing".

U.S. Official Action dated Sep. 20, 2005 cited in U.S. Appl. No. 10/186,463.

G. Fitzmaurice et al., "Tracking Menus," CHI 2003, vol. 5, No. 2, pp. 71-80, 2003.

* cited by examiner

SEPARATING AND MOVING DOCUMENT OBJECTS USING THE MOVEMENT OF A WIPER BAR

RELATED PATENT APPLICATIONS

This patent application is related to the following co-pending non-provisional patent applications: U.S. patent application Ser. No. 09/852,799 filed on May 11, 2001, entitled "Serial Storage of Ink and Its Properties" and U.S. patent application Ser. No. 09/430,150 filed on Oct. 29, 1999, entitled "Universal File Format for Digital Rich Ink Data." Both related applications are assigned to the Microsoft Corporation. Both of these related applications are assigned to Microsoft Corporation and are hereby incorporated by reference.

This patent application is also related to the following non-provisional patent applications: U.S. patent application Ser. No. 10/780,366 filed Feb. 17, 2004, entitled "Writing Guide for a Free-Form Document Editor"; U.S. patent application Ser. No. 10/186,847 filed Jun. 28, 2002, entitled "Method and System for Editing Electronic Ink"; U.S. patent application Ser. No. 10/186,874 filed Jun. 28, 2002, entitled "Method and System for Selecting Objects on a Display Device"; U.S. patent application Ser. No. 10/186,812 filed Jun. 28, 2002, entitled "Resolving Document Object Collisions"; U.S. patent application Ser. No. 10/186,865 filed Jun. 29, 2002, entitled "System and Method for Automatically Recognizing Electronic Handwriting in an Electronic Document and Converting to Text"; U.S. patent application Ser. No. 10/186,820 filed Jun. 28, 2002, entitled "Method and System for Designating Data Objects with Designation Tools"; and U.S. patent application Ser. No. 10/186,463 filed Jun. 28, 2002, entitled "Method and System for Displaying and Linking Ink Objects with Recognized Text and Objects". These applications and the applications herein are all being filed on the same date, Jun. 28, 2002, and are assigned to the Microsoft Corporation.

FIELD OF THE INVENTION

The present invention relates to editing electronic documents and more specifically relates to a tool for managing the available space in an electronic document.

BACKGROUND OF THE INVENTION

Electronic documents are typically designed to be constrained by external factors, such as the size of the paper on which the document will be printed. Conventional document editors, such as word processing application programs typically provide a user with tools to edit documents by adding, modifying, and deleting text and other document objects (e.g., pictures). The editing of a conventional electronic document is usually constrained by external factors, such as the document size. The document size may be determined by the size of the printer paper on which the user intends to print the document. These constraints typically result in a corresponding document "behavior." For example, if a user adds a document object that overlaps a right margin of the document that represents one edge of the printer paper (i.e., a document boundary), then the word processor application will typically move that object to the left margin, further down on the page. If an object is added that overlaps a bottom margin, then the word processor will typically move the object to the next page. Moving a document object to accommodate the page boundaries is typically referred to as "wrapping."

More recently, free-form document editors have been developed. Free-form document editors can exhibit novel document behavior in part by being responsive to fewer external constraints. Free-form document editors may not have many of the boundary constraints that can be found in conventional word processing application programs. Accordingly, a free-form document editor may have a different document behavior than a typical word processor document editor.

Free-form document editors have been designed to limit the constraints on an electronic document, so that a user may create free-form documents. This is considered to be a very valuable to enabling a user to engage in free-form note taking. It has been determined that some document constraints can lead to a reduction in a user's ability to take notes efficiently and effectively using a conventional document editor. A free-form document editor operates to eliminate some document constraints by enabling free-form note taking.

Note-taking on a free-form document editor can be enhanced by the use of certain hardware devices. For example, an electronic tablet can be used to record handwriting and input the handwriting to a convention computer. Such electronic tablets typically comprise a screen and a handheld device that is similar to a pen (also referred to as a stylus). A user can use the pen to write on the electronic tablet in a manner similar to the use of traditional pen and paper. The electronic tablet can "read" the strokes of the user's handwriting with the handheld device and render the handwriting in electronic form on the tablet's screen and/or the computer's display as "electronic ink".

The reduction of the influence of external constraints has triggered a need for space management in free-form document editors. In conventional document editors, page boundaries were constrained in most or all directions (i.e., top, bottom, left, and right). With an exemplary free-form document editor, however, page boundaries must be expandable. Therefore, there is a need for a space management tool that enables expansion of the boundaries or margins of a page to enable the addition or expansion of one or more document objects. The tool also should enable the contraction of the boundaries of a page to reduce the available space on the page.

SUMMARY OF THE INVENTION

The present invention provides a tool for managing the available space in an electronic document. The tool can be used to expand the boundaries or margins of a page to enable the addition or expansion of one or more document objects. The tool can also be used to contract the boundaries of a page to reduce the available space on the page. A simple user interface enables a user to easily move one or more document objects to create more space between document objects on the page or to eliminate space between document objects on the page. The user interface also enables a user to easily create more space within a particular document object. The user interface utilizes a wiper bar that spans the page or the document object and selects the objects that may be affected by creating or eliminating space on the page. A side wiper also may be provided to move document boundaries away from the objects on the page.

In one aspect of the invention, a method is provided for modifying the size of an electronic document. An insertion point is determined and a determination is made as to whether a wiper mode has been invoked. If a determination is made that the wiper mode has been invoked, then a wiper bar is displayed. A wipe direction signal is received. At least one document object is moved in the direction of the direction signal and at least one page boundary can be moved in the direction of the direction signal.

In another aspect of the invention, a method is provided for moving at least one document object on a page. An insertion point is determined. A determination is made as to whether a wiper mode has been invoked. In response to a determination that the wiper mode has been invoked, a wiper bar is displayed. A determination is made as to whether available space exists. In response to a determination that the available space exists, an available space bar is displayed. A wipe direction signal is received and at least one document object is moved in a direction of the direction signal. At least one page boundary can be moved in the direction of the direction signal.

In yet another aspect of the invention, a system is provided for modifying a page size of an electronic document. The system includes a wiper bar operative to segregate document objects on the page. A selection means is provided for selecting at least one of the segregated document objects on the page. A direction signal indicates a direction in which the page size will be modified. The system includes a means for moving at least one of the segregated document objects in the direction of the direction signal and a means for moving at least boundary of the page in the direction of the direction signal.

The various aspects of the present invention may be more clearly understood and appreciated from a review of the following detailed description of the disclosed embodiments and by reference to the drawings and claims.

DETAILED DESCRIPTION OF THE EXEMPLARY EMBODIMENTS

Exemplary embodiments of the present invention provide a tool for managing the available space in an electronic document. The tool can be used to expand the boundaries or margins of a page to enable the addition or expansion of one or more document objects. The tool can also be used to contract the boundaries of a page to reduce the available space on the page. A simple user interface enables a user to easily move one or more document objects to create more space between document objects on the page or to eliminate space between document objects on the page. The user interface also enables a user to easily create more space within a particular document object. The user interface utilizes a wiper bar that spans the page or the document object and selects the objects that may be affected by creating or eliminating space on the page. A side wiper also may be provided to move document boundaries away from the objects on the page.

More recently, a new kind of document editor has been developed. The Microsoft Corporation of Redmond, Wash. has developed a free-form document editor that exhibits novel document behavior in part because the document editor is designed to respond to fewer external constraints. Microsoft's free-form document editor doesn't have many of the boundary constraints that can be found in conventional word processing application programs. Accordingly, a free-form document editor has a different document behavior than a word processor document editor.

Some free-form document editors have been designed to limit the constraints on an electronic document, so that a user may create free-form documents. This is considered to be a very valuable to enabling a user to engage in free form note taking. It has been determined that some document constraints can lead to a reduction in a user's ability to take notes efficiently and effectively using a conventional document editor. The free-form document editor operates to eliminate some document constraints by enabling free-form note taking.

Note-taking on a free-form document editor, such as a free-form document editor can be enhanced by the use of certain hardware devices. For example, an electronic tablet can be used to record handwriting and input the handwriting to a convention computer. Such electronic tablets typically comprise a screen and a handheld device that is similar to a pen (also referred to as a stylus). A user can use the pen to write on the electronic tablet in a manner similar to the use of traditional pen and paper. The electronic tablet can "read" the strokes of the user's handwriting with the handheld device and render the handwriting in electronic form on the tablet's screen and/or the computer's display as "electronic ink".

An Exemplary Operating Environment

Figure 1:
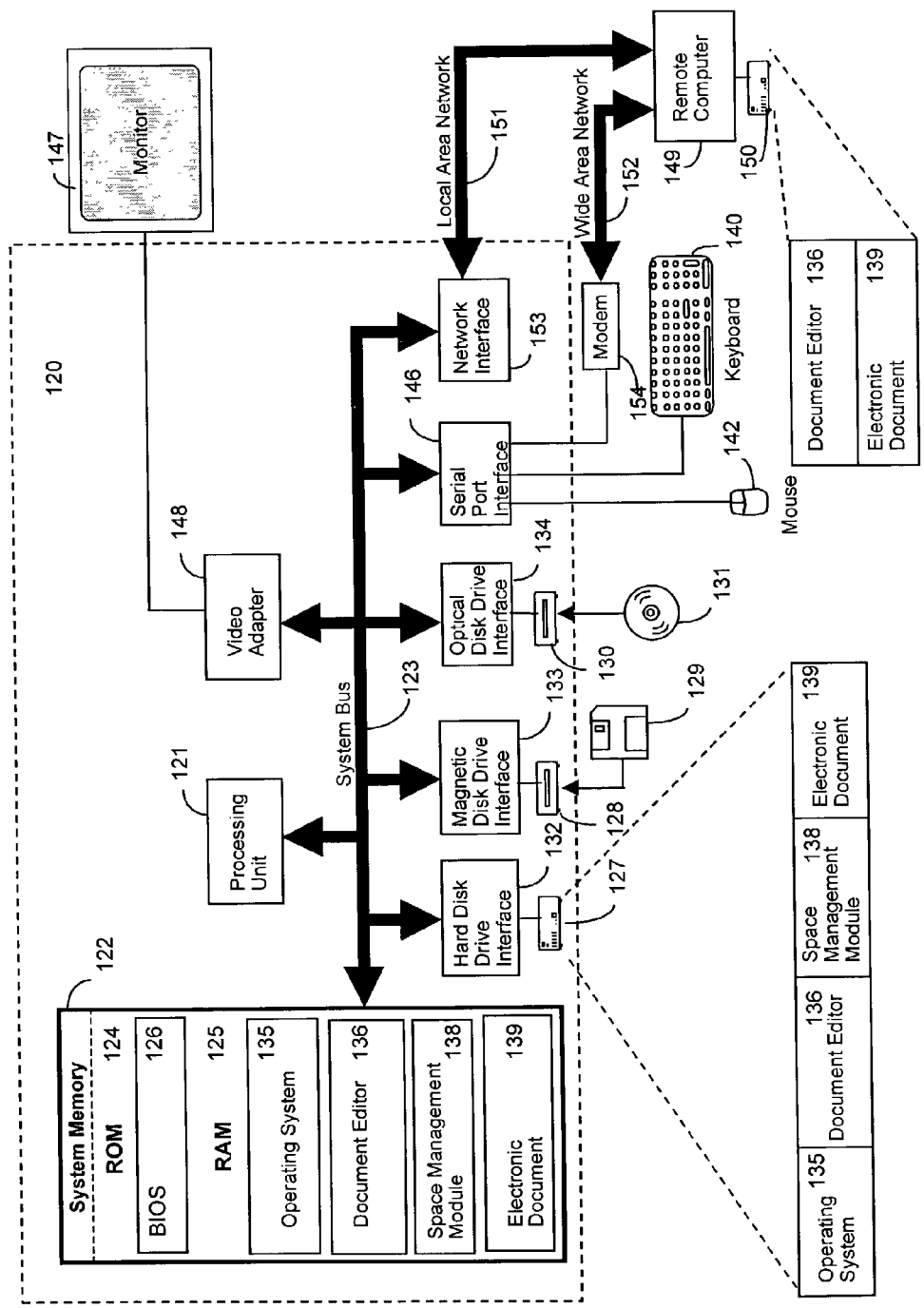
FIG. 1 is a block diagram illustrating an exemplary operating environment for implementation of various embodiments of the present invention.

Exemplary embodiments of the present invention will hereinafter be described with reference to the drawings, in which like numerals represent like elements throughout the several figures. FIG. 1 illustrates an exemplary operating environment for implementation of the present invention. The exemplary operating environment includes a general-purpose computing device in the form of a conventional personal computer 120. Generally, the personal computer 120 includes a processing unit 121, a system memory 122, and a system bus 123 that couples various system components including the system memory 122 to the processing unit 121. The system bus 123 may be any of several types of bus structures including a memory bus or memory controller, a peripheral bus, and a local bus using any of a variety of bus architectures. The system memory includes a read-only memory (ROM) 124 and a random access memory (RAM) 125. A basic input/output system (BIOS) 126, containing the basic routines that help to transfer information between elements within personal computer 120, such as during start-up, is stored in ROM 124.

Personal computer 120 further includes a hard disk drive 127 for reading from and writing to a hard disk, not shown, a magnetic disk drive 128 for reading from or writing to a removable magnetic disk 129, and an optical disk drive 130 for reading from or writing to a removable optical disk 131 such as a CD-ROM or other optical media. Hard disk drive 127, magnetic disk drive 128, and optical disk drive 130 are connected to system bus 123 by a hard disk drive interface 132, a magnetic disk drive interface 133, and an optical disk drive interface 134, respectively. Although the exemplary environment described herein employs hard disk 127, removable magnetic disk 129, and removable optical disk 131, it should be appreciated by those skilled in the art that other types of computer readable media which can store data that is accessible by a computer, such as magnetic cassettes, flash memory cards, digital video disks, Bernoulli cartridges, RAMs, ROMs, and the like, may also be used in the exemplary operating environment. The drives and their associated computer readable media provide nonvolatile storage of computer-executable instructions, data structures, program modules, and other data for personal computer 120.

A number of program modules may be stored on hard disk 127, magnetic disk 129, optical disk 131, ROM 124, or RAM 125, including an operating system 135, a document editor 136, a space management module 138, and an electronic document 139. Program modules include routines, sub-routines, programs, objects, components, data structures, etc., which perform particular tasks or implement particular abstract data types. Aspects of the present invention may be implemented in the form of a document editor 136 that can operate in concert with the space management module 138 to edit the electronic document 139. The document editor 136 generally comprises computer-executable instructions for creating and editing electronic documents. The space management module 138 is generally accessible to the document editor 136, but also can be implemented as an integral part of the document editor.

A user may enter commands and information into personal computer 120 through input devices, such as a keyboard 140 and a pointing device 142. Pointing devices may include a mouse, a trackball, and an electronic pen that can be used in conjunction with an electronic tablet. Other input devices (not shown) may include a microphone, joystick, game pad, satellite dish, scanner, or the like. These and other input devices are often connected to processing unit 122 through a serial port interface 146 that is coupled to the system bus 123, but may be connected by other interfaces, such as a parallel port, game port, a universal serial bus (USB), or the like. A display device 147 may also be connected to system bus 123 via an interface, such as a video adapter 148. In addition to the monitor, personal computers typically include other peripheral output devices (not shown), such as speakers and printers.

The personal computer 120 may operate in a networked environment using logical connections to one or more remote computers 149. Remote computer 149 may be another personal computer, a server, a client, a router, a network PC, a peer device, or other common network node. While a remote computer 149 typically includes many or all of the elements described above relative to the personal computer 120, only a memory storage device 150 has been illustrated in the Figure. The logical connections depicted in the Figure include a local area network (LAN) 151 and a wide area network (WAN) 152. Such networking environments are commonplace in offices, enterprise-wide computer networks, intranets, and the Internet.

When used in a LAN networking environment, the personal computer 120 is often connected to the local area network 151 through a network interface or adapter 153. When used in a WAN networking environment, the personal computer 120 typically includes a modem 154 or other means for establishing communications over WAN 152, such as the Internet. Modem 154, which may be internal or external, is connected to system bus 123 via serial port interface 146. In a networked environment, program modules depicted relative to personal computer 120, or portions thereof, may be stored in the remote memory storage device 150. It will be appreciated that the network connections shown are exemplary and other means of establishing a communications link between the computers may be used.

Moreover, those skilled in the art will appreciate that the present invention may be implemented in other computer system configurations, including hand-held devices, multi-processor systems, microprocessor based or programmable consumer electronics, network person computers, minicomputers, mainframe computers, and the like. The invention may also be practiced in distributed computing environments, where tasks are performed by remote processing devices that are linked through a communications network. In a distributed computing environment, program modules may be located in both local and remote memory storage devices.

Figure 2:
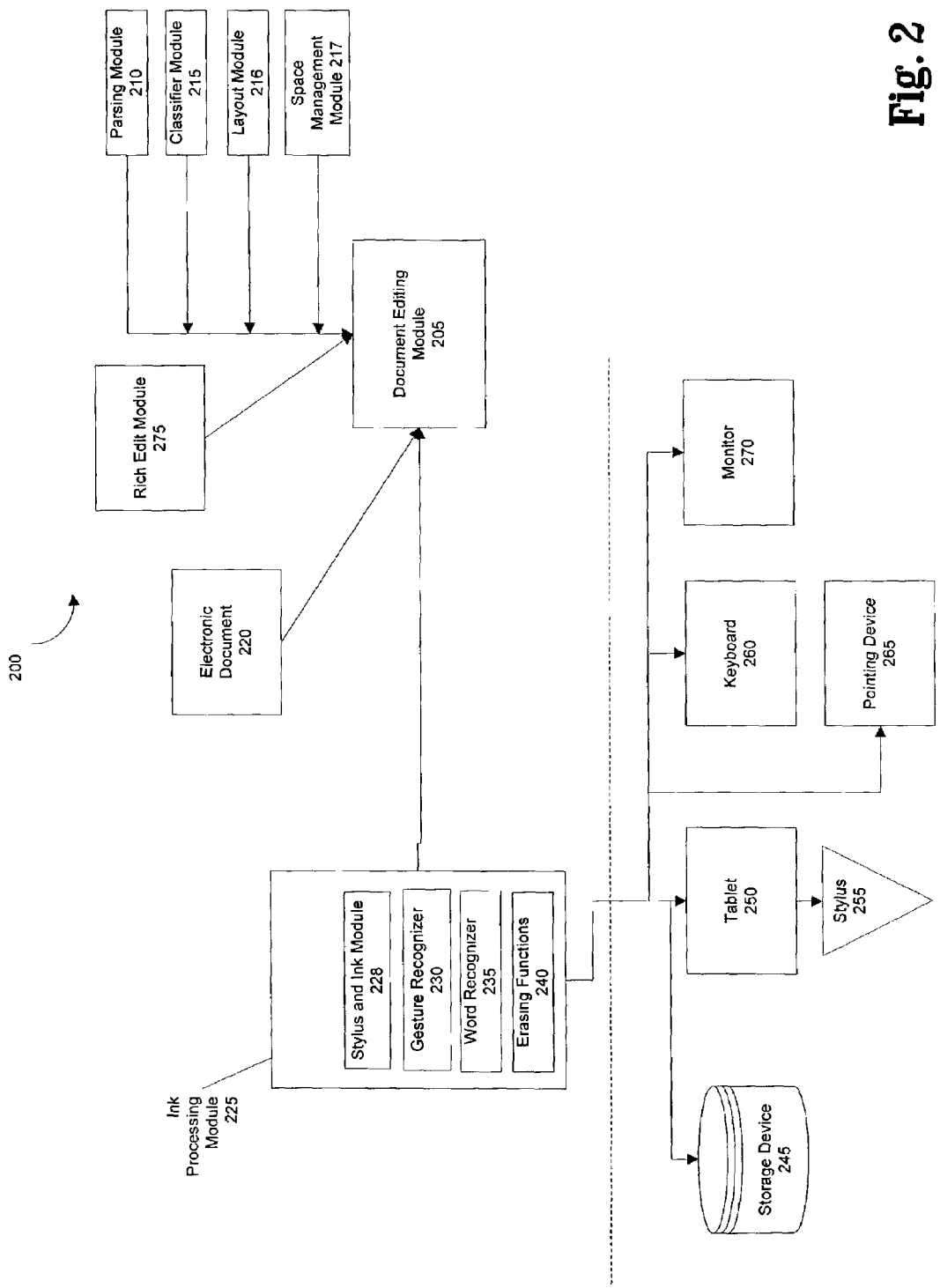
FIG. 2 is a block diagram depicting the primary functional components of an exemplary free-form document editor and related input devices.

FIG. 2 is a block diagram depicting the primary functional components of an exemplary free-form document editor and related input devices. Specifically, FIG. 2 depicts typical hardware and software components used in operating an exemplary embodiment of the invention in the context of a free-form document editor. Conventional input devices are represented by the keyboard 260 and the pointing device 265 (e.g., mouse, pen and tablet). A user can enter commands and information into the computer 20 using the pointer device and/or another input devices. Other input devices (not shown) may include a microphone, joystick, game pad, satellite dish, and scanner. A conventional output device, such as monitor 270, is used to display information from the computer 20. Other output devices (not shown) can include a printer or speaker. Other hardware components shown in FIG. 2 include an electronic tablet 250 and an accompanying stylus 255. The tablet 250 and stylus 255 are used to input handwriting strokes which can be converted to data, referred to as electronic ink. The electronic ink may be incorporated into an electronic document 220 and may be displayed on either the electronic tablet 250, the monitor 270, or both. Although the electronic tablet 250 and the monitor 270 are illustrated as being distinct, in an exemplary embodiment of the present invention, they can be integrated into a single component. The joint tablet/monitor component has the ability to display information and receive input from the stylus 255.

In the representative architecture 200 all of the hardware components are coupled to an ink processing software module 225. The ink-processing module 225 is operable to receive data from the electronic tablet 250 and to render that data as electronic ink. In one embodiment of the present invention, the ink-processing module 225 can be a collection of software modules that perform different tasks for rendering handwriting strokes as electronic ink. For example, the stylus and ink module 228 can receive data describing the positions and angles of the stylus for a series of handwriting strokes. The stylus and ink module 228 can interpret the data for rendering electronic ink. Other software modules, such as a gesture recognizer 230 and word recognizer 235 can be designed to identify certain handwriting strokes and assign them a particular significance. For example, certain gestures such as a cross-out may be recognized and associated with other editing processes. The ink-processing module 225 can also include an erasing functions module 240 for removing electronic ink that has been previously rendered.

Although ink processing modules are known in the art and necessary for an electronic tablet to function, a novel document editing module has been developed by the Microsoft Corporation of Redmond, Wash. that capitalizes on the benefits of handwriting processing technology. As stated above, a free-form document editor leverages the functionality of electronic handwriting technology to enable more effective and efficient note taking. Specifically, the document editing module 205 facilitates the manipulation of electronic ink so that a user can create and modify an electronic document 220 with greater ease and sophistication. The document editing module 205 typically comprises a collection of software modules for controlling and manipulating electronic ink rendered on the monitor 270. For example, a parsing module 210 can be used to identify handwriting strokes that are selected by the user for editing. Selected strokes may by highlighted or shaded to assist the user in identifying which strokes are to be edited. A classifier module 215 can identify certain handwriting strokes as being part of a word or drawing and may designate document objects accordingly. Software modules such as the layout module 216 and the insert space module 217 can be designed to control how electronic ink is rendered and moved.

Exemplary embodiments of the present invention relate most directly to the management of space in an electronic document. The functionality of various embodiments may be performed by a space management module 217 or may be fully integrated into the operation of the document editing module 205. FIGS. 1 and 2 provide a general overview of the environments in which the inventors contemplate exemplary embodiments of the present invention will be used.

Figure 3:
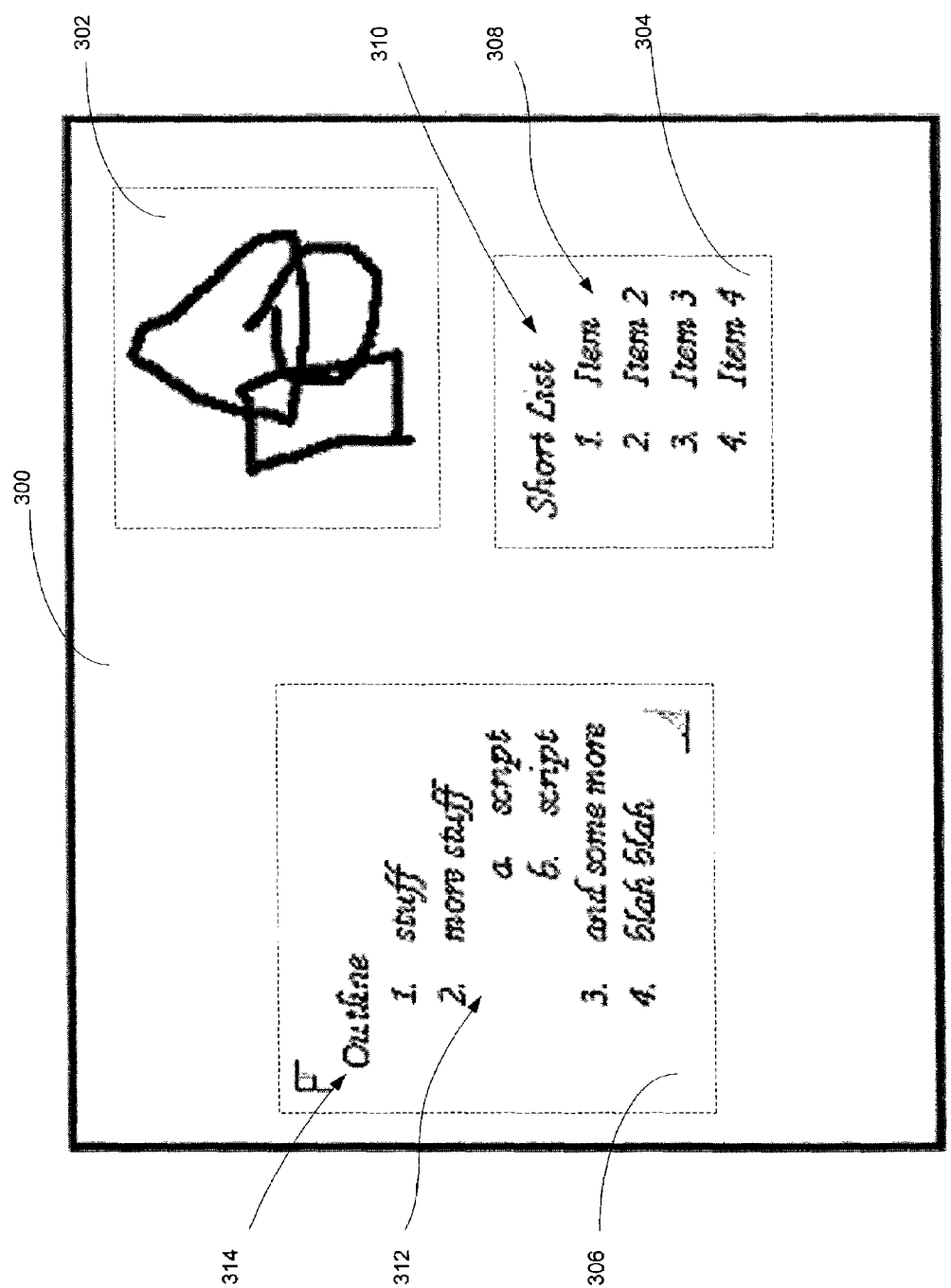
FIG. 3 is a block diagram depicting an exemplary page containing document objects.

FIG. 3 is a block diagram depicting an exemplary page 300 containing document objects 302–306. The page 300 may be one of many pages associated with an electronic document that can be edited by a document editor. The page 300 includes three document objects, 302–306. Generally stated, document objects are a container that includes any content that can be edited and/or displayed as part of an electronic document. Document objects include drawing objects, text objects, handwriting objects and picture objects. Those skilled in the art will appreciate that document objects can contain virtually any form of content and/or media that can be rendered in connection with an electronic document.

The page 300 depicted in FIG. 3 includes a drawing object 302 and two text objects 304, 306. A first text object 304 is comprised of a list of items 308 under a heading 310. A second text document object 306 includes a multi-level outline 312 under a heading 314. In an exemplary document editor, each document object can be independently moved on the page 300. The document editor user may place an insertion point in a document object and modify the document object. However, when a document object is close to a boundary of the page 300, the user's ability to add material to the document object may be constrained by the inability of the document object to increase in size. That is, increasing the size of a document object may cause the document object to contact a boundary of the page 300. While some document editors enable the automatic expansion of some page boundaries, most document editors will require the user to take an affirmative step to modify a page boundary. For example, in a word processor document editor, the bottom boundary is typically automatically expandable. On the other hand, the right boundary is typically not automatically expanded. A word processor document editor user must usually change the size of the paper in order to expand the right boundary of a page.

In recently developed free-form document editors, the page boundaries can be automatically expandable or can be expandable through user configuration. Exemplary embodiments of the present invention provide a tool for enabling a user to expand the boundaries of a page quickly and easily. These embodiments may also enable the user to move document objects within the page boundaries. This functionality can be useful when a user desires to add a new document object between existing document objects or desires to add more content to a particular document object. FIGS. 4–11 are directed to various embodiments of the present invention that enable the expansion and contraction of page boundaries in conjunction with the movement and/or otherwise modification of document objects on the page.

Figure 4:
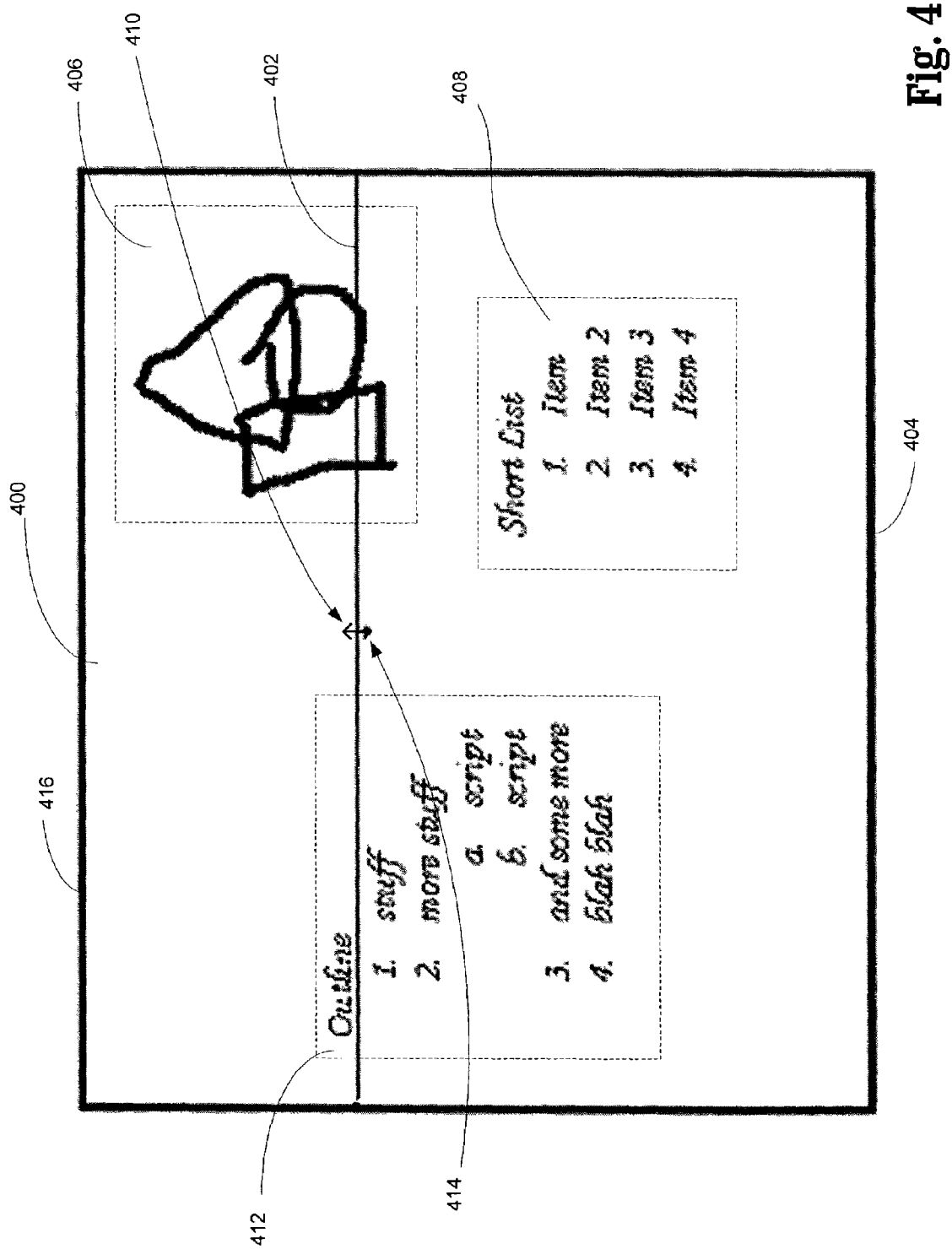
FIG. 4 is a block diagram depicting a page with a wiper bar of an exemplary embodiment of the present invention.

FIG. 4 is a block diagram depicting a page 400 with a wiper bar 402 of an exemplary embodiment of the present invention. The wiper bar 402 can be used to expand a boundary of the page 400. In the case depicted in FIG. 4, the wiper bar 402 can be used to expand the bottom boundary 404 of the page 400. For example, a user may wish to add an object between drawing document object 406 and text document object 408. The user may invoke the wiper bar 402 at a selected insertion point on 410 on the page 400.

In an exemplary embodiment of the present invention, the user will invoke a wiper mode by, for example, selecting a wiper mode icon on a toolbar. Once the wiper mode has been invoked, the user can select an insertion point 410 at which the user desires to segregate document objects for editing space on the page 400. Once the insertion point 410 has been determined, a wiper bar 402 can be provided that expands the width of the page 400. The wiper bar 402 is a demarcation line segregating document objects that will be moved, such as text document object 408, from document objects that will not be moved, such as drawing document object 406. Objects that will be moved may be displayed in a highlighted or selected fashion, so that the user can predict the results of the wiper bar operation. In an exemplary embodiment of the present invention, only document objects that are fully below the wiper bar 402 will be selected. In the example of the page 400 of FIG. 4, only text document object 408 will be selected because it is the only document object that is fully below the wiper bar 402. Text object 412 and drawing document object 406 will not be selected as they are not fully below the wiper bar. Those skilled in the art will appreciate that the wiper bar can be used to move document objects and document boundaries in any direction. The downward moving wiper bar 402 of FIG. 4 is used for illustrative purposes only. An orientation arrow 414 can be used to indicate the direction in use the wiper bar is oriented. If the orientation arrow 414 were pointed towards the top boundary 416 of the page 400, then the objects above the wiper bar 402 would be selected.

The user can move the selected document objects by dragging the wiper bar 402 in the direction of the orientation arrow 414. The selected document objects will be moved in that direction, the same distance as the wiper bar 402 is dragged. In an exemplary embodiment of the present invention, the wiper bar can be dragged by the use of a pointer device, such as a mouse, electronic tablet and pen, or a keyboard. Although not depicted in FIG. 4, a vertical wiper bar (not shown) could be used to move document objects and page boundaries to the left or right.

In an exemplary embodiment of the present invention, the document objects and relevant page boundaries will be moved such that the physical orientation of the moved document objects with respect to the moved boundary is maintained. That is, the moved boundary will be moved the same distance as the moved document objects. In an alternative embodiment, the boundary position may be maintained while the document objects are moved. In this alternative embodiment, the relevant page boundary would be moved only when necessary to enable further movement of the moved document objects. That is, the boundary might only be moved when one of the moved objects comes into contact with the boundary.

Figure 5:
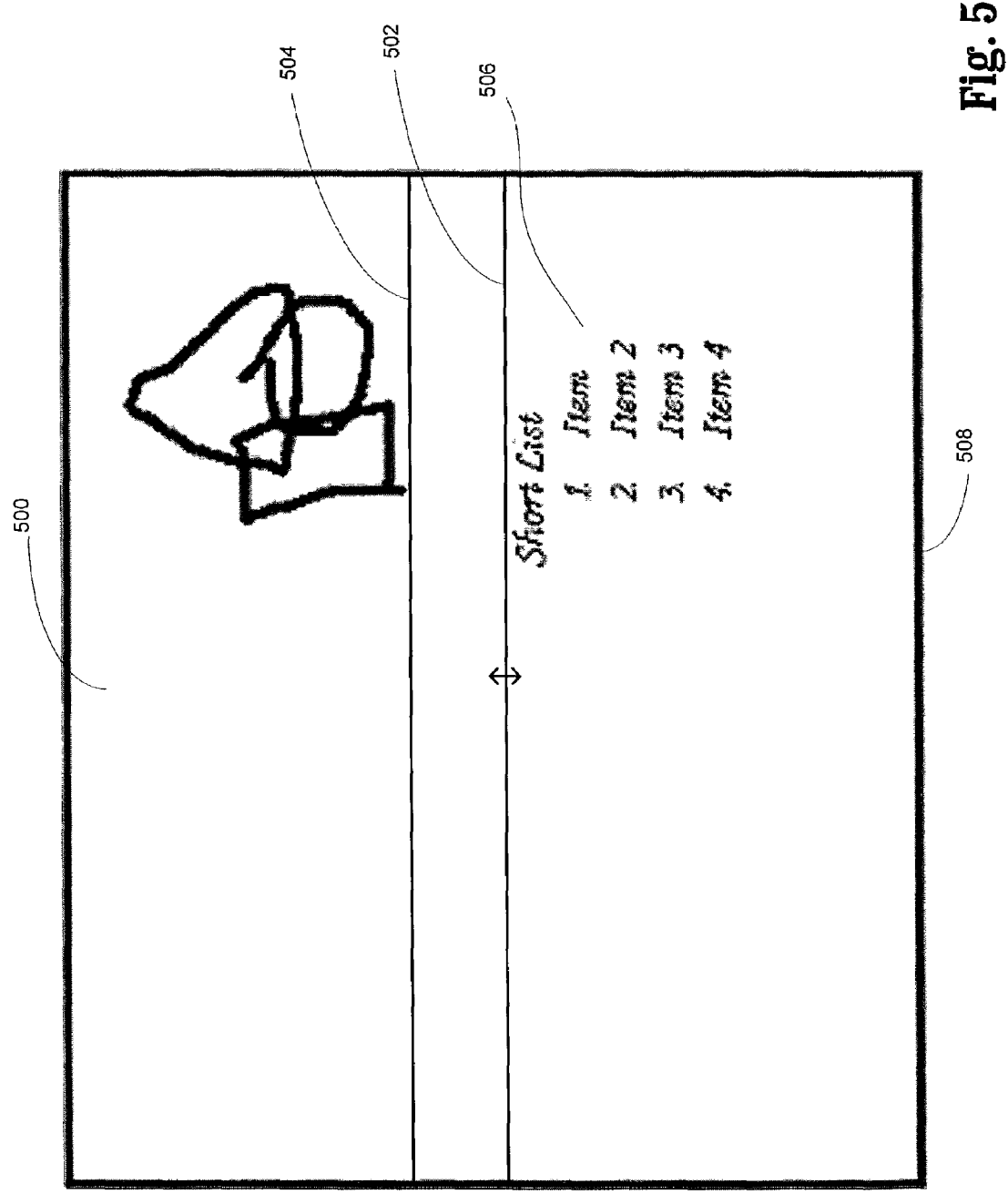
FIG. 5 is a block diagram depicting a page with a wiper bar and an available space bar of an exemplary embodiment of the present invention.

FIG. 5 is a block diagram depicting a page 500 with a wiper bar 502 and an available space bar 504. In an exemplary embodiment of the present invention, the available space bar 504 can be displayed to enable a user to eliminate space on a page where no document object resides. When a user invokes a wiper bar, the wiper bar can be made to span the entire width of the page 500. In cases where the wiper bar 502 expands the entire page 500 without crossing any document object, there may be space available for elimination.

When a wiper bar 502 does not cross any document object, a determination can be made as to whether available space exists by determining how far above and below the wiper bar 502 that a second horizontal line could be displayed across the width of the page 500 without crossing any document object. Once the available space has been determined, the boundaries of the available space can be represented with the wiper bar 502 at one boundary of the available space and the available space bar 504 at the other boundary of the available space.

Once the wiper bar 502 and the available space bar 504 have been displayed, the user can eliminate some or all of the available space by moving the wiper bar 502 toward the available space bar 504. The user also may increase the available space by moving the wiper bar 502 away from the available space bar 504. If the user selects to add available space, document objects such as text document object 506 and boundaries such as the bottom boundary 508 will be moved in the direction of the wiper bar 502.

Figure 6:
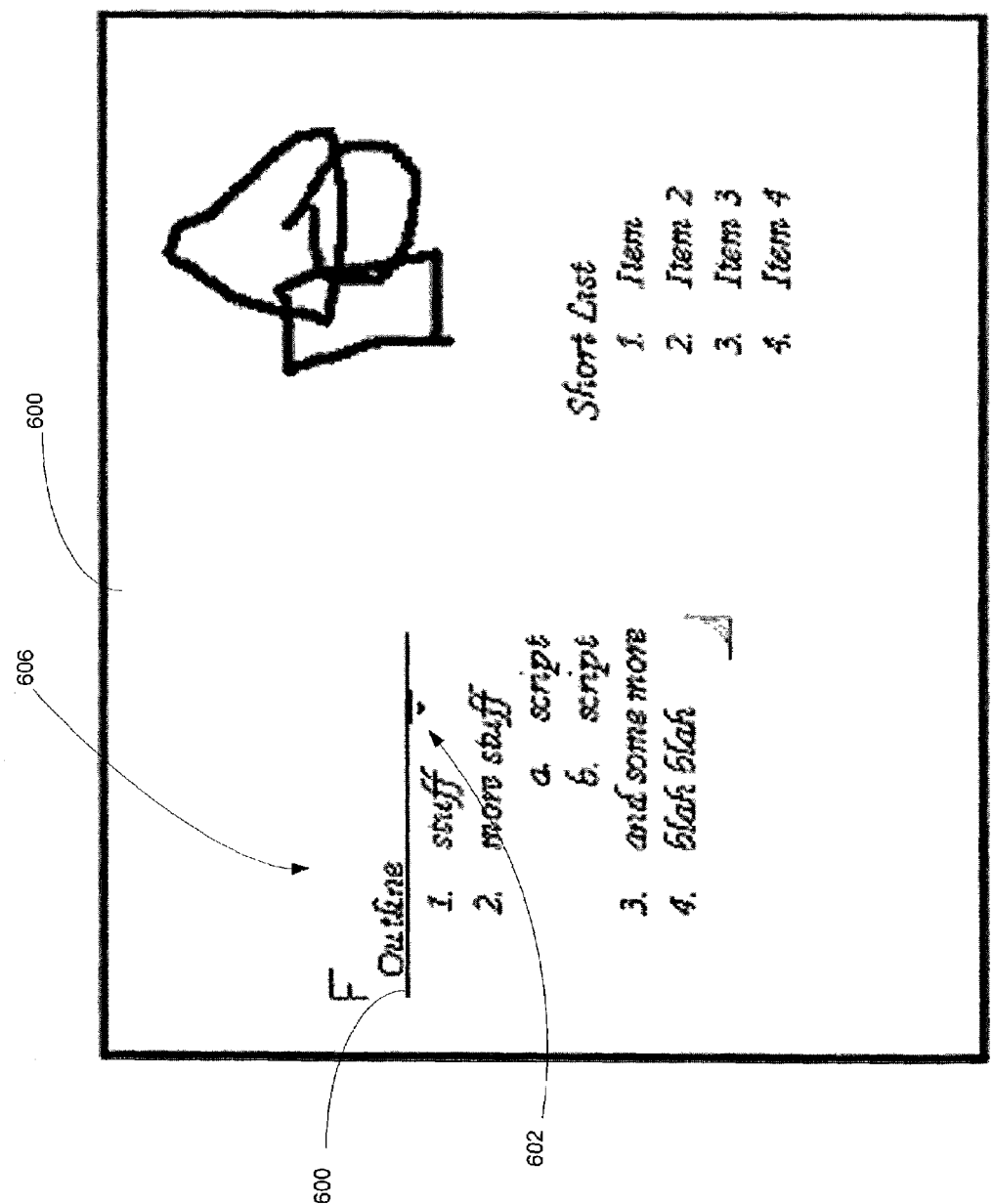
FIG. 6 is a block diagram depicting an in-object wiper bar of an exemplary embodiment of the present invention.

FIG. 6 is a block diagram depicting an in-object wiper bar 600 of an exemplary embodiment of the present invention. The in-object wiper bar 600 operates in the same manner as the page wiper bar described above. However, the in-object wiper bar will move elements within a document object in the direction of the orientation arrow 602. Movement of the elements of the document object may not affect the location of other document objects on the page 604 or elements other than the document objects. Indeed, it is contemplated by the inventors that users will typically prefer that an in-object wipe operation will only move object elements within the object and will not affect other objects. If the expanded document object 606 collides with another document object, then the hit document object may be moved. The behavior of colliding document objects is the subject matter of another co-pending patent application that is also assigned to Microsoft Corporation of Redmond, Wash. and has been assigned U.S. patent application Ser. No., 10/186,812, entitled "Resolving Document Object Collisions." That patent application is hereby incorporated by reference.

Figure 7:
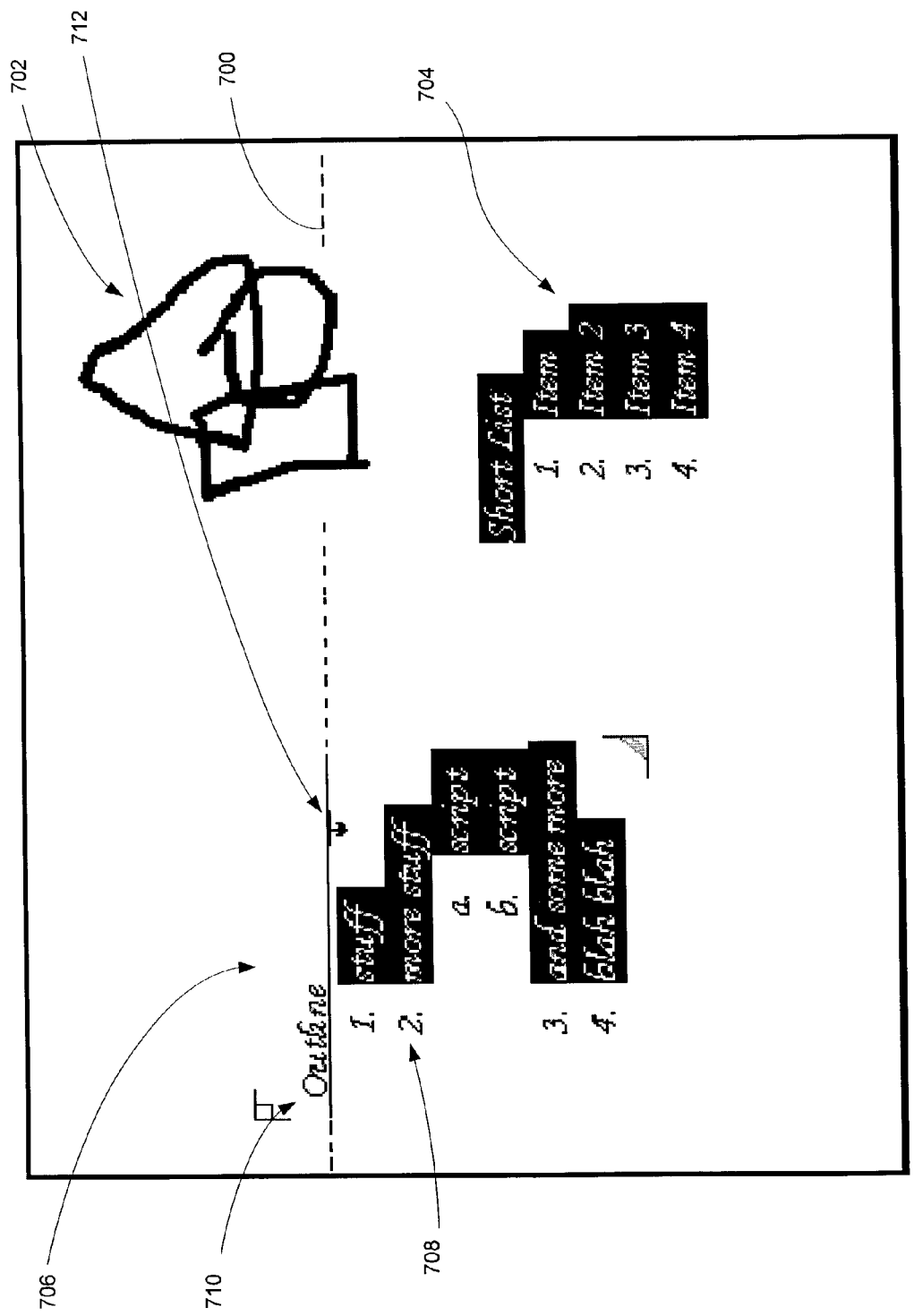
FIG. 7 is a block diagram depicting document objects and document object elements segregated by a wiper bar of an alternative embodiment of the present invention.

FIG. 7 is a block diagram depicting document objects 702–706 and document object elements 708, 710 that have been segregated by a wiper bar 700 of an alternative embodiment of the present invention. In the embodiment depicted in FIG. 7, the wiper bar 700 can be used as a combination in-object wiper bar and page wiper bar. In this embodiment, the combination wiper bar 700 can segregate elements of object 706 as well as entire document objects such as text document object 704. In this embodiment, the user can select an insertion point within a document object such as text document object 706. The insertion point may segregate document object elements such as heading 710 from multi-level outline 708. However, the wiper bar 700 also may segregate document objects such as drawing document object 702 from text document object 704.

In order to effect the document and element segregation depicted in FIG. 7, a special pointer operation may be required. For example, the user may be required to select an insertion point within text document object 706 and then move the orientation arrow 712 out of the document object to indicate the desire to perform a combination segregation. By pulling the combination wiper bar 700 in the direction of the orientation arrow 712, the user can add space in the text document object 706 and in the page.

Figure 8:
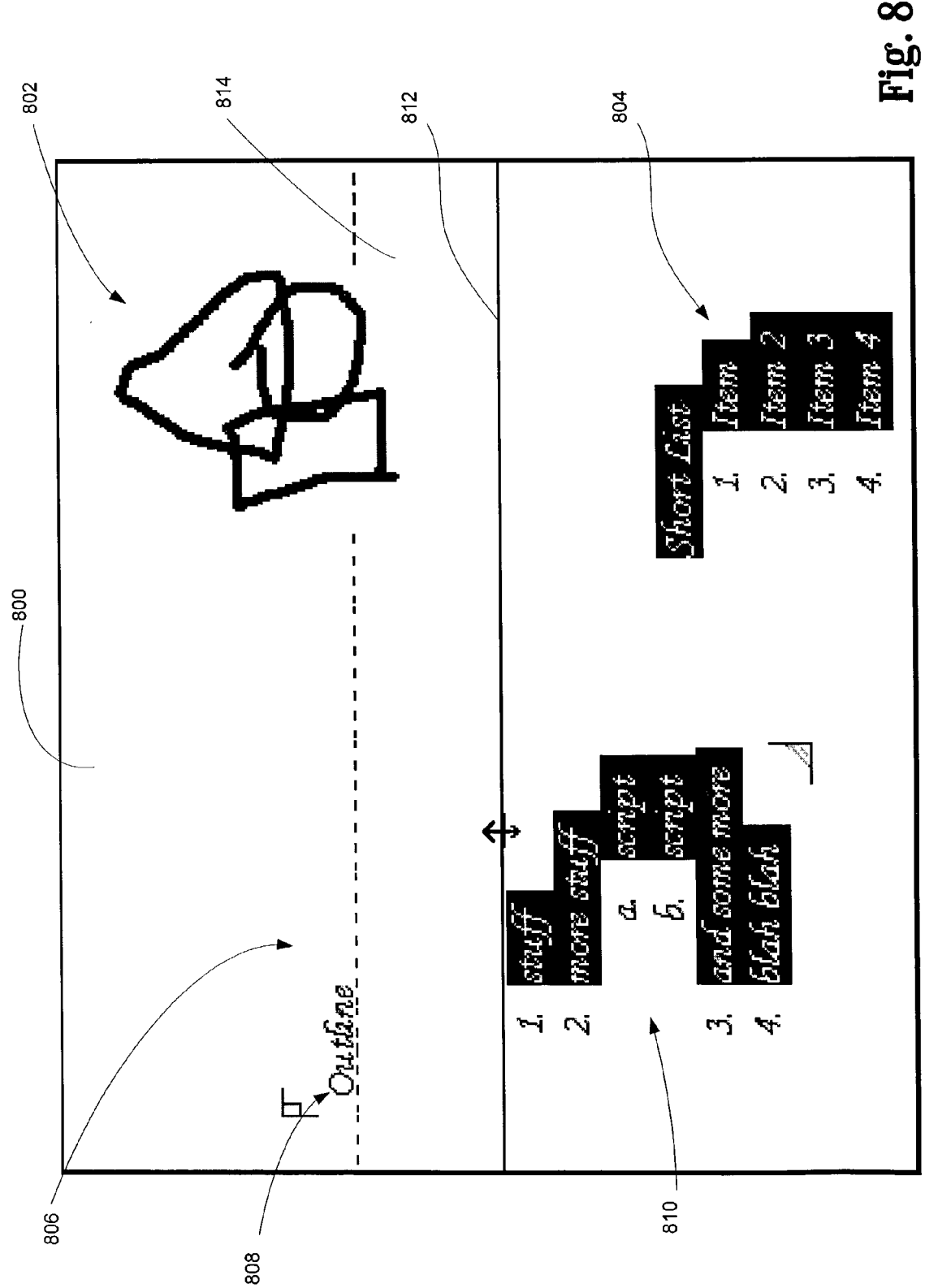
FIG. 8 is a block diagram depicting document objects and document object elements that have been moved on a page in accordance with an exemplary embodiment of the present invention.

FIG. 8 is a block diagram depicting document objects 802–806 and document object elements 808–810 that have been moved on a page 800 in accordance with the exemplary embodiment of the present invention described in connection with FIG. 7. The wiper bar 812 has been moved in a downward direction to create available space 814 both within text document object 806 and on the entire page 800.

In yet another alternative embodiment, the movement of the wiper bar 812 can be snapped to an invisible grid representing text line heights. That is, when the available space 814 is added to text document object 806 by dragging the wiper bar 812, the available space will be added in increments of line heights.

Figure 9:
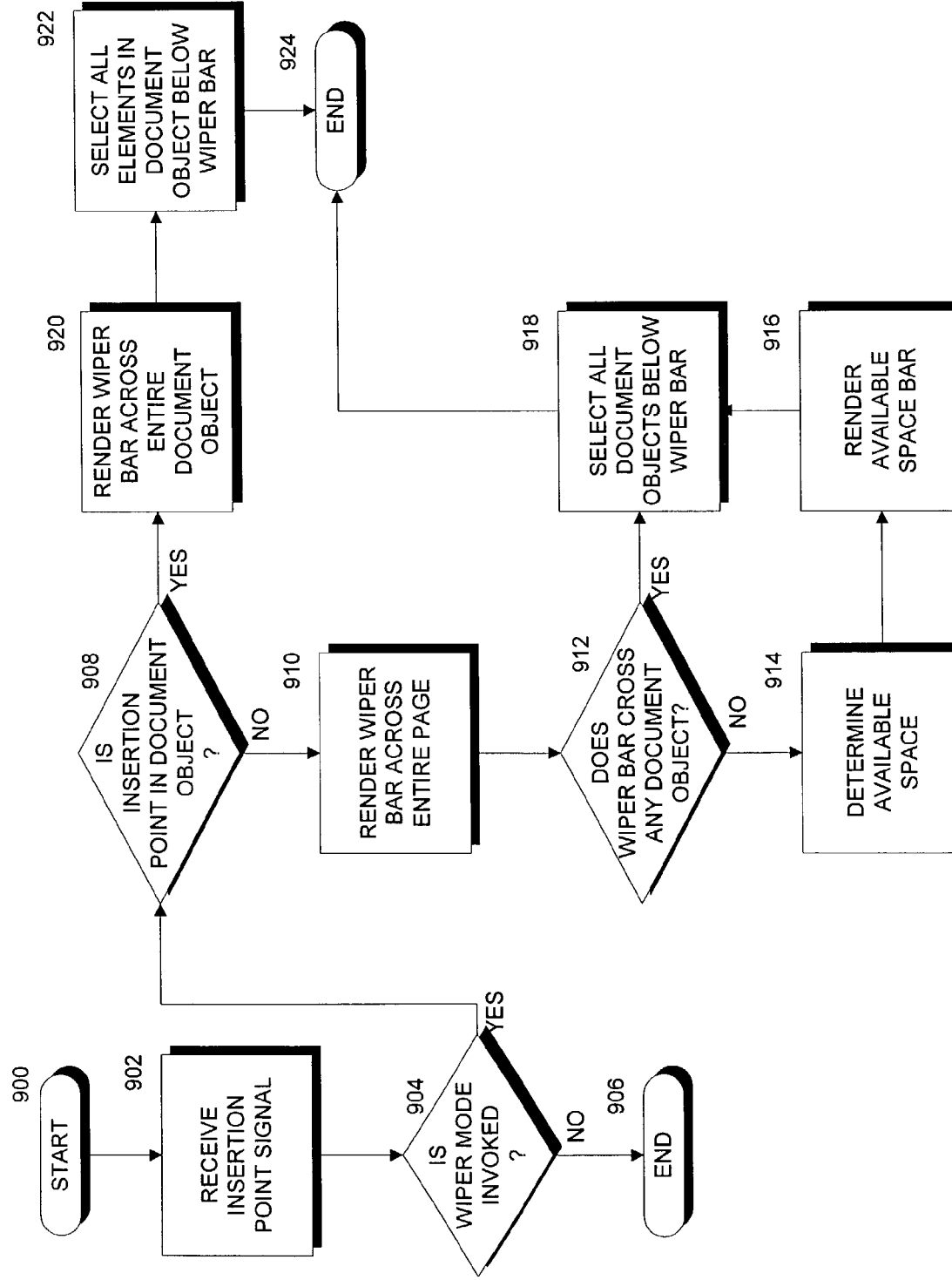
FIG. 9 is a flow chart depicting an exemplary method for displaying a wiper bar for segregating document objects on a page.

FIG. 9 is a flow chart depicting an exemplary method for displaying a wiper bar for segregating document objects on a page. The method of FIG. 9 begins at start block 900 and proceeds to step 902. At step 902, an insertion point signal is received. Typically this step will be performed by a user using a pointing device to indicate the point in a page at which the insertion point should be placed. The method proceeds from step 902 to decision block 904. At decision block 904, a determination is made as to whether a wiper mode has been invoked. If the wiper mode has not been invoked, the method terminates at end block 906. If, on the other hand, the wiper mode has been invoked, the method branches from decision block 904 to decision block 908.

At decision block 908, a determination is made as to whether the insertion point is inside a document object. As discussed above, an in-object wiper bar can be used to move document elements, while a standard wiper bar can be used to move document objects and page boundaries. If the insertion point is within a document object, the method branches from decision block 908 to step 920. At step 920, a wiper bar is rendered across the entire document object. The method proceeds to step 922. At step 922, all document object elements in the document object below the wiper bar are selected. Those skilled in the art will appreciate that the selected elements can be on either side of the wiper bar and that an orientation arrow may be used to indicate which document object elements will be selected. The method proceeds from step 922 to end block 924 and terminates.

Returning now to decision block 908, if a determination is made that the insertion point is not in a document object, the method branches from decision block 908 to step 910. At step 910, a wiper bar is rendered across the entire page. The method proceeds from step 910 to decision 912. At decision block 912, a determination is made as to whether the wiper bar crosses any document object. As described above, if a wiper bar does not cross any object on the page, then this indicates that available space may exist in proximity to the wiper bar. If the wiper bar does not cross a document object, the method branches from decision block 912 to step 914. At step 914, the available space is determined. The method proceeds from step 914 to step 916. At step 916 an available space bar is rendered across the width of the page. As described above, the wiper bar and the available space bar represent the boundaries of available space in proximity to the selected insertion point. The method proceeds from step 916 to step 918. At step 918, all document objects below the wiper bar are selected. The method proceeds from step 918 to end block 924 and terminates.

Returning now to decision block 912, if a determination is made that the wiper bar crosses a document object, then no available space exists and method proceeds to step 918. At step 918, all document objects below the wiper bar are selected. As stated above, method of FIG. 9 describes the use of a wiper bar or selecting and moving objects in a downward direction. However, those skilled in the art will appreciate that the same method may be applied to move document objects, move page boundaries, and eliminate available space in any direction. The method proceeds from step 918 to end block 924 and terminates.

Figure 10:
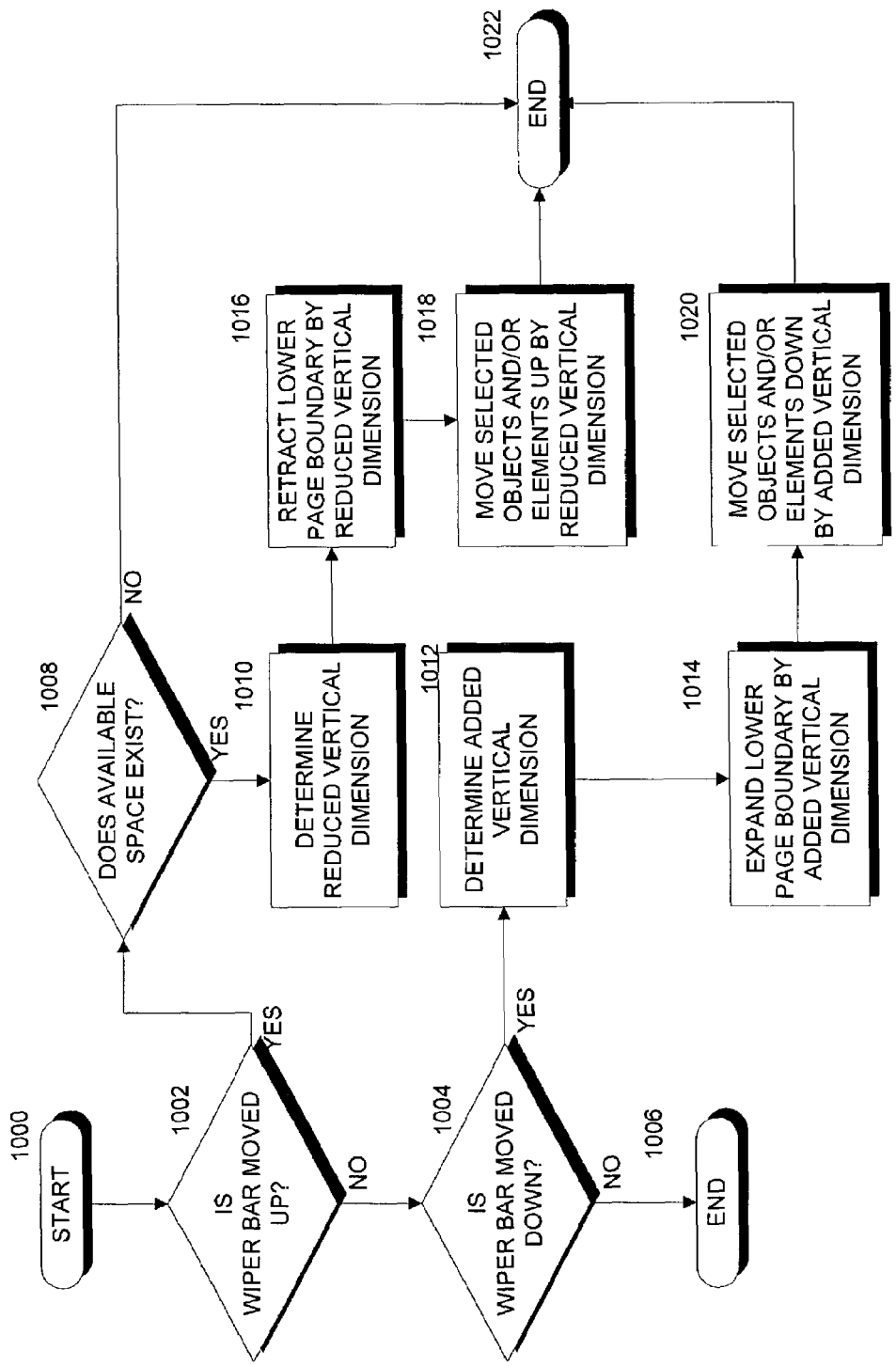
FIG. 10 is a flow chart depicting an exemplary method for moving page boundaries and segregated document objects on a page.

FIG. 10 is a flow chart depicting an exemplary method for moving page boundaries and segregated document objects on a page. FIG. 10 would typically be performed following the steps of the method depicted in the flow chart of FIG. 9. After the document objects have been selected as described in connection with FIG. 9, the method of FIG. 10 would typically be invoked in various embodiments of the present invention to move page boundaries and document objects.

The method of FIG. 10 begins at start block 1000 and proceeds to decision block 1002. At decision block 1002, a determination is made as to whether the wiper bar is moved in an upward direction. If the wiper bar is not moved in an upward direction, the method proceeds to decision block 1004. At decision block 1004, a determination is made as to whether the wiper bar is moved in a downward direction. If the wiper bar is not moved in a downward direction, then the method branches to end block 1006 and terminates.

Returning now to decision block 1002, if a determination is made that the wiper bar is moved in an upward direction, the method branches to decision block 1008. At decision block 1008, a determination is made as to whether available space exists. As described in connection with FIG. 9, the determination of whether available space exists may be performed by analyzing the space in proximity to the wiper bar. If that operation has already been performed, a flag may be used to indicate that available space exists in the proximity of the wiper bar. Accordingly, in an exemplary embodiment of the present invention, the determination of decision block 1008 may be performed by actually checking for available space or by checking the flag associated with the previously made determination. If a determination is made that no available space exists, the method branches from decision block 1008 to end block 1022 and terminates.

If, on the other hand, a determination is made that available space exists, the method branches from decision block 1008 to step 1010.

At step 1010, the reduced vertical dimension is determined. This determination can be made by monitoring a pointer drag operation performed by the user. For example, the user may drag the insertion point from its original location to a new location. The vertical dimension can be determined by comparing the distance between the two locations in the vertical direction. The step proceeds from step 1010 to step 1016. At step 1016, the lower page boundary is retracted by the reduced vertical dimension. Accordingly, the page size is reduced in the vertical direction by the same distance as the insertion point was dragged. Those skilled in the art will appreciate that the removal of space from the page may not necessarily retract the page boundary. In an alternative embodiment, the page boundary may not retract unless the user makes an affirmative decision and/or operation to retract the page boundary. In yet another alternative embodiment, the page boundary may be depicted in a printed representation of the page as having been automatically retracted, while the page boundary depicted on the display may not be represented as having been retracted.

The method proceeds from step 1016 to step 1018. At step 1018, the selected objects and/or document object elements are moved in the upward direction a distance equal to the reduced vertical dimension. The method proceeds from step 1018 to end block 1022 and terminates.

Returning now to decision block 1004, if a determination is made that the wiper bar has been moved in a downward direction, the method branches from decision block 1004 to step 1012. At step 1012, an added vertical dimension is determined. As described in connection with step 1010, the added vertical dimension may be the difference between the original insertion point and a new point to which the user has dragged the insertion point. The method proceeds from step 1012 to step 1014. At step 1014, the lower page boundary is expanded by the added vertical dimension. Those skilled in the art will appreciate that the addition of space to the page may not necessarily expand the page boundary. In an alternative embodiment, the page boundary may not expand unless the user makes an affirmative decision and/or operation to expand the page boundary or unless a document object comes into contact with the page boundary. In yet another alternative embodiment, the page boundary may be depicted in a printed representation of the page as having been automatically expanded, while the page boundary depicted on the display may not be represented as having been expanded.

The method proceeds from step 1014 to step 1020 and the selected objections and/or elements are moved in a downward direction by the added vertical dimension. The method then proceeds from step 1020 to end block 1022 and terminates.

As described in connection with FIG. 9, the method of FIG. 10 presumes that the wiper bar is displayed horizontally across a page and that the orientation arrow is in the downward direction. Accordingly, a move in the upward direction is described as a reduction of available space. Likewise, a movement of the wiper bar in a downward direction is indicative of a user's desire to add space on the page. Those skilled in the art will appreciate that this orientation is used for illustrative purposes only, and that the wiper bar could be used to add or reduce space in any direction.

Figure 11:
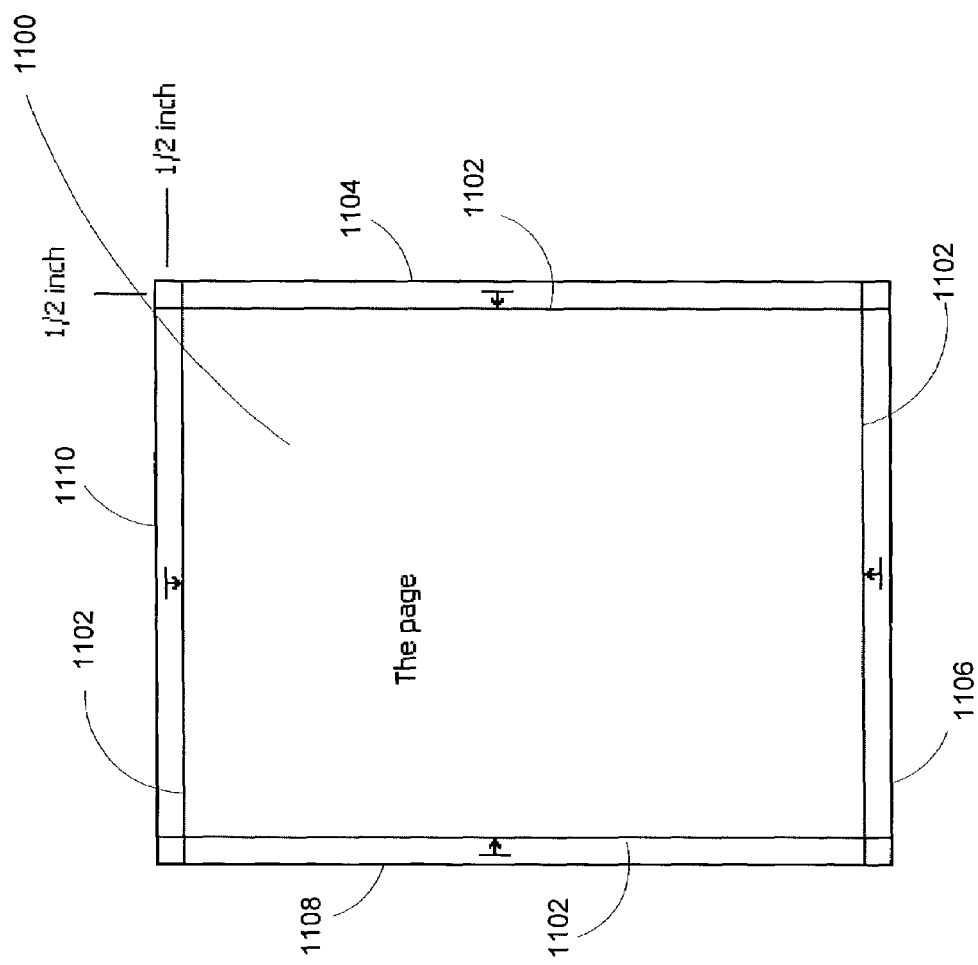
FIG. 11 is a block diagram depicting a side wiper bar of an exemplary embodiment of the present invention.

FIG. 11 is a block diagram depicting a side wiper bar of an exemplary embodiment of the present invention. FIG. 11 depicts a page having boundaries 1104–1110. When the wiper mode has been invoked, a side wiper bar 1102 can be displayed in certain conditions. In one embodiment of the present invention, a side wiper bar can be displayed when the wipe mode has been invoked and a pointer cursor comes within a predetermined distance of the page boundary. In the example of FIG. 11, if the pointer cursor comes within one half inch of the page boundary, then a side wiper bar 1102 will be displayed. If the user drags the side wiper bar by use of the pointer, the side wiper bar can be used to add available space between the document objects on the page 1100 and one of the page boundaries 1104, 1110.

Although the present invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A method for modifying the size of an electronic document, the method comprising:
    determining an insertion point within the electronic document;
    determining whether a wiper mode has been invoked;
    displaying a wiper bar in response to a determination that the wiper mode has been invoked, the wiper bar passing through the insertion point and two other points lying on an edge of the electronic document the wiper bar comprising a demarcation line passing across the electronic document and segregating documents objects configured to be moved from document objects configured not to be moved, the documents configured to be moved being displayed in a highlighted manner;
    receiving a wipe direction signal; and
    moving at least one document object selected from the documents objects configured to be moved in a direction of the direction signal, the direction of the direction signal being relative to the wiper bar.

2. The method of claim 1, further comprising the step of moving at least one page boundary in the direction of the direction signal.

3. The method of claim 2, wherein the step of moving the page boundary comprises increasing a page size.

4. The method of claim 2, wherein the step of moving the page boundary comprises reducing a page size.

5. The method of claim 1, wherein the step of determining an insertion point comprises receiving a signal from a user input device.

6. The method of claim 5, wherein the user input device is a pointer device.

7. The method of claim 6, wherein the pointer device is a tablet pen.

8. The method of claim 6, wherein the pointer device is a mouse.

9. The method of claim 6, wherein the pointer device is a keyboard.

10. The method of claim 1, further comprising the step of selecting at least one document object in response to a determination that the wiper mode has been invoked.

11. The method of claim 10, further comprising the step of selecting at least one object below the wiper bar in response to a determination that the wiper mode has been invoked.

12. The method of claim 10, further comprising the step of selecting at least one object above the wiper bar in response to a determination that the wiper mode has been invoked.

13. The method of claim 1, wherein the step of receiving a wipe direction signal comprises receiving a signal from a user input device.

14. The method of claim 1, wherein the step of determining whether a wiper mode has been invoked comprises determining whether a wiper tool icon has been selected.

15. The method of claim 1, wherein the step of determining whether a wiper mode has been invoked comprises determining whether a predetermined pointer operation has been performed.

16. The method of claim 1, further comprising the step of displaying a wiper bar in response to a determination that the wiper mode has been invoked and that a pointer cursor is within a predetermined distance from a page boundary.

17. A method for moving at least one document object on a page, comprising:
    determining an insertion point within the page;
    determining whether a wiper mode has been invoked;
    displaying a wiper bar in response to a determination that the wiper mode has been invoked, the wiper bar passing through the insertion point and two other points lying on an edge of the page the wiper bar comprising a demarcation line passing across the page and segregating documents objects configured to be moved from document objects configured not to be moved, the documents configured to be moved being displayed in a highlighted manner;
    determining whether an available space exists;
    displaying an available space bar in response to a determination that the available space exists;
    receiving a wipe direction signal, the direction of the direction signal being relative to the wiper bar; and
    moving at least one document object selected from the documents objects configured to be moved in a direction of the direction signal.

18. The method of claim 17, further comprising the step of moving at least one page boundary in the direction of the direction signal in response to a determination that at least one page object has contacted the page boundary.

19. The method of claim 18, wherein the step of moving the page boundary comprises increasing a page size.

20. The method of claim 18, wherein the step of moving the page boundary comprises reducing a page size.

21. The method of claim 17, wherein the step of determining whether the available space exists comprises determining whether the wiper bar crosses a document object.

22. The method of claim 17, further comprising the step of selecting at least one document object in response to a determination that the wiper mode has been invoked.

23. The method of claim 22, further comprising the step of selecting at least one object below the wiper bar in response to a determination that the wiper mode has been invoked.

24. The method of claim 22, further comprising the step of selecting at least one object above the wiper bar in response to a determination that the wiper mode has been invoked.

25. The method of claim 17, wherein the step of receiving a wipe direction signal comprises receiving a signal from a user input device.

26. The method of claim 17, further comprising the step of displaying a wiper bar in response to a determination that the wiper mode has been invoked and that a pointer cursor is within a predetermined distance from a page boundary.

27. A computer system for editing a document, the system operative to modify a page size of an electronic document, comprising:

a wiper bar operative to segregate document objects on the page within the electronic document, the wiper bar passing through an insertion point within the page and two other points lying on an edge of the page the wiper bar comprising a demarcation line passing across the page and segregating documents objects configured to be moved from document objects configured not to be moved, the documents configured to be moved being displayed in a highlighted manner;

a selection means for selecting at least one of the segregated document objects on the page;

a direction signal indicating a direction in which the page size will be modified, the direction of the direction signal being relative to the wiper bar;

a means for moving at least one of the segregated document objects selected from the documents objects configured to be moved in the direction of the direction signal; and a means for moving at least a boundary of the page in the direction of the direction signal.

* * * * *